US008489242B2

(12) United States Patent
Valluri et al.

(10) Patent No.: US 8,489,242 B2
(45) Date of Patent: Jul. 16, 2013

(54) HOME ENERGY MANAGEMENT SYSTEM INCORPORATING A POOL PUMP

(75) Inventors: Nagaraju Valluri, Louisville, KY (US); John Besore, Prospect, KY (US); Timothy Worthington, Crestwood, KY (US); Michael Finch, Louisville, KY (US); Jeff Drake, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/985,479

(22) Filed: Jan. 6, 2011

(65) Prior Publication Data
US 2012/0053737 A1 Mar. 1, 2012

(51) Int. Cl.
*G05B 13/00* (2006.01)

(52) U.S. Cl.
USPC .............................. 700/276; 62/131; 417/12

(58) Field of Classification Search
USPC .............................. 700/276; 62/131; 417/12
See application file for complete search history.

(56) References Cited

U.S. PATENT DOCUMENTS

| 5,100,542 | A | * | 3/1992 | Landman et al. | 210/101 |
| 5,572,438 | A | | 11/1996 | Ehlers et al. | |
| 5,684,710 | A | | 11/1997 | Ehlers et al. | |
| 5,696,695 | A | * | 12/1997 | Ehlers et al. | 700/286 |
| 6,039,886 | A | * | 3/2000 | Henkin et al. | 210/776 |
| 6,280,611 | B1 | * | 8/2001 | Henkin et al. | 210/143 |
| 6,387,250 | B1 | * | 5/2002 | Henkin et al. | 210/97 |
| 7,130,719 | B2 | * | 10/2006 | Ehlers et al. | 700/276 |
| 2001/0010032 | A1 | * | 7/2001 | Ehlers et al. | 702/62 |
| 2002/0103655 | A1 | | 8/2002 | Boies et al. | |
| 2004/0050075 | A1 | * | 3/2004 | King et al. | 62/131 |
| 2004/0133314 | A1 | * | 7/2004 | Ehlers et al. | 700/276 |
| 2005/0033707 | A1 | * | 2/2005 | Ehlers et al. | 705/412 |
| 2007/0043477 | A1 | | 2/2007 | Ehlers et al. | |
| 2008/0177678 | A1 | * | 7/2008 | Di Martini et al. | 705/412 |
| 2008/0187443 | A1 | * | 8/2008 | Aguilar et al. | 417/12 |
| 2009/0157529 | A1 | * | 6/2009 | Ehlers et al. | 705/26 |
| 2010/0017045 | A1 | | 1/2010 | Nesler et al. | |
| 2010/0179704 | A1 | | 7/2010 | Ozog | |
| 2011/0077758 | A1 | * | 3/2011 | Tran et al. | 700/94 |

* cited by examiner

*Primary Examiner* — Mohammad Ali
*Assistant Examiner* — Anthony Whittington
(74) *Attorney, Agent, or Firm* — Global Patent Operation

(57) ABSTRACT

An energy management system for a home network is provided. The energy management system includes one or more power consuming devices, including at least a pool pump system having a motor and a filter with a filtration cycle, a central controller operatively connected to the power consuming devices and configured to receive and process a signal indicative of the current state of an associated utility, including at least a peak demand state and an off-peak demand state, and a display. The central controller is configured to operate the pool pump system in one of a plurality of operating modes, including at least a normal operating mode and an energy savings mode, and to provide pool pump usage information to a user via a user interface on the display.

17 Claims, 4 Drawing Sheets

HOME ENERGY MANAGEMENT SYSTEM INCORPORATING A POOL PUMP

BACKGROUND OF THE DISCLOSURE

This disclosure relates to an energy management system and more particularly to the management of devices in an energy management system. The disclosure finds particular application to incorporating a pool pump in energy management platforms.

Many utilities are currently experiencing a shortage of electric generating capacity due to increasing consumer demand for electricity. Currently utilities charge a flat rate, but with increasing cost of fuel prices and high energy usage at certain parts of the day, utilities have to buy more energy to supply customers during peak demand. Lowering peak demand provides a huge cost savings and lessens the peak load that the utility has to accommodate. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times and to reduce overall energy consumption of power consuming devise in a home network at all times.

A home energy management system has been developed and described in U.S. application Ser. No. 12/892,130, (GE 237986), fully incorporated by reference herein, that can automatically operate and disable power consuming devices in a designated home network in response to signals received from a utility. The energy management system includes a central controller, such as a Home Energy Manager (HEM)/Home Energy Gateway (HEG), in communication with each of the power consuming devices and provides a homeowner the means to monitor and manage their energy consumption through a combination of behavior modification and programmed control logic. The HEM/HEG provides real-time feedback to a user regarding the performance and energy consumption of the devices in the home network. Active and real time communication of energy costs of power consuming devices to the consumer enables informed choices for operating those power consuming functions.

The home energy management system is designed to manage the operation of power consuming devices in a home network and provide homeowners with power and cost saving information. It would be advantageous, however, to further include additional devices into the system, such as a pool pump, and enable users to control the device and decide how the device should react in periods of high demand to provide cost and energy savings.

SUMMARY OF THE DISCLOSURE

In accordance with one aspect of the present disclosure, an energy management system for a home network is provided. The energy management system includes one or more power consuming devices, including at least a pool pump system having a motor and a filter with a filtration cycle, a central controller operatively connected to the power consuming devices and configured to receive and process a signal indicative of the current state of an associated utility, including at least a peak demand state and an off-peak demand state, and a display. The central controller is configured to operate the pool pump system in one of a plurality of operating modes, including at least a normal operating mode and an energy savings mode, and to provide pool pump usage information to a user via a user interface on the display.

In accordance with another aspect of the present disclosure, a method for reducing the peak power consumption of a pool pump system in an energy management system including one or more power consuming device, a central controller configured to receive and process a signal indicative of the current state of an associated utility, the utility state being at least one of a peak demand period and an off-peak demand period, and a pool pump system having a motor and filter with a filtration cycle. The method comprises the steps of a) receiving and processing a utility state signal into the central controller, b) at least one of operating and scheduling to operate the pool pump system such that the pool pump system operates primarily during an off-peak demand period, and c) operating the pool pump system in a reduced-flow condition during periods of peak demand.

In accordance with yet another aspect of the present disclosure, a pool pump for use in an energy management system having one or more power consuming devices and a central controller configured to receive and process a signal indicative of the current state of an associated utility, including at least a peak demand state and an off-peak demand state is provided. The pool pump system comprises a motor configured to drive water from an associated pool through the pool pump, a filter capable of filtering contaminates from pool water, and a flow-reducing device configured to limit the amount of water flow that is filtered through the pool pump. The central controller is configured to activate the flow-reducing device in response to a signal indicative of a peak demand state.

DETAILED DESCRIPTION OF THE PREFERRED EMBODIMENTS

As briefly described above, the home energy management system comprises an electronic system having a home energy manager (HEM)/home energy gateway (HEG) acting as a central controller operationally coupled to a home network of power consuming devices that provides a homeowner the means to monitor and manage their energy consumption through a combination of behavior modification and programmed control logic. The central controller provides real-time feedback on electricity, water, and natural gas consumption as well as providing data on renewable energy generation occurring at the home, such as solar photovoltaic generation, wind generation, or any other type of renewable energy generation.

The central controller also stores consumption data and provides data to a user via an associated user interface display. According to a first configuration, the central controller operates as a data server for providing data through an application programming interface (API) in a client application, which can then be used to present this data to the homeowner on a client device. Once data is received by the API, the client device/program uses this information to generate graphs of energy usage, generation and/or storage on the client device. In another configuration, data pertaining to the consumer's energy consumption, generated energy, and/or storage is displayed on a display, such as an LCD touch screen display, integral with the central controller. Additionally, through a web server integrated in the controller, the display on other devices in communication with the central controller, such as a homeowner's networked PC, mobile phone, or other device, may further be used to display energy data to a user.

A communication device, such as a ZigBee radio may be implemented to facilitate communication signals between the central controller and devices within the home, while a second radio operates similarly between the central controller and the utility, such as for demand response event signals/ price signals. Any communication protocol can be implemented and the present disclosure is not limited to ZigBee as one of ordinary skill in the art will appreciate. The central controller may operate as a gateway device by caching or storing information from devices within a home, such as historical power consumption data, or demand response event information from the utility. The central controller therefore provides the necessary information from the utility to the devices in home network for them to operate in accord with the utility signals and/or user preferences.

Figure 1:
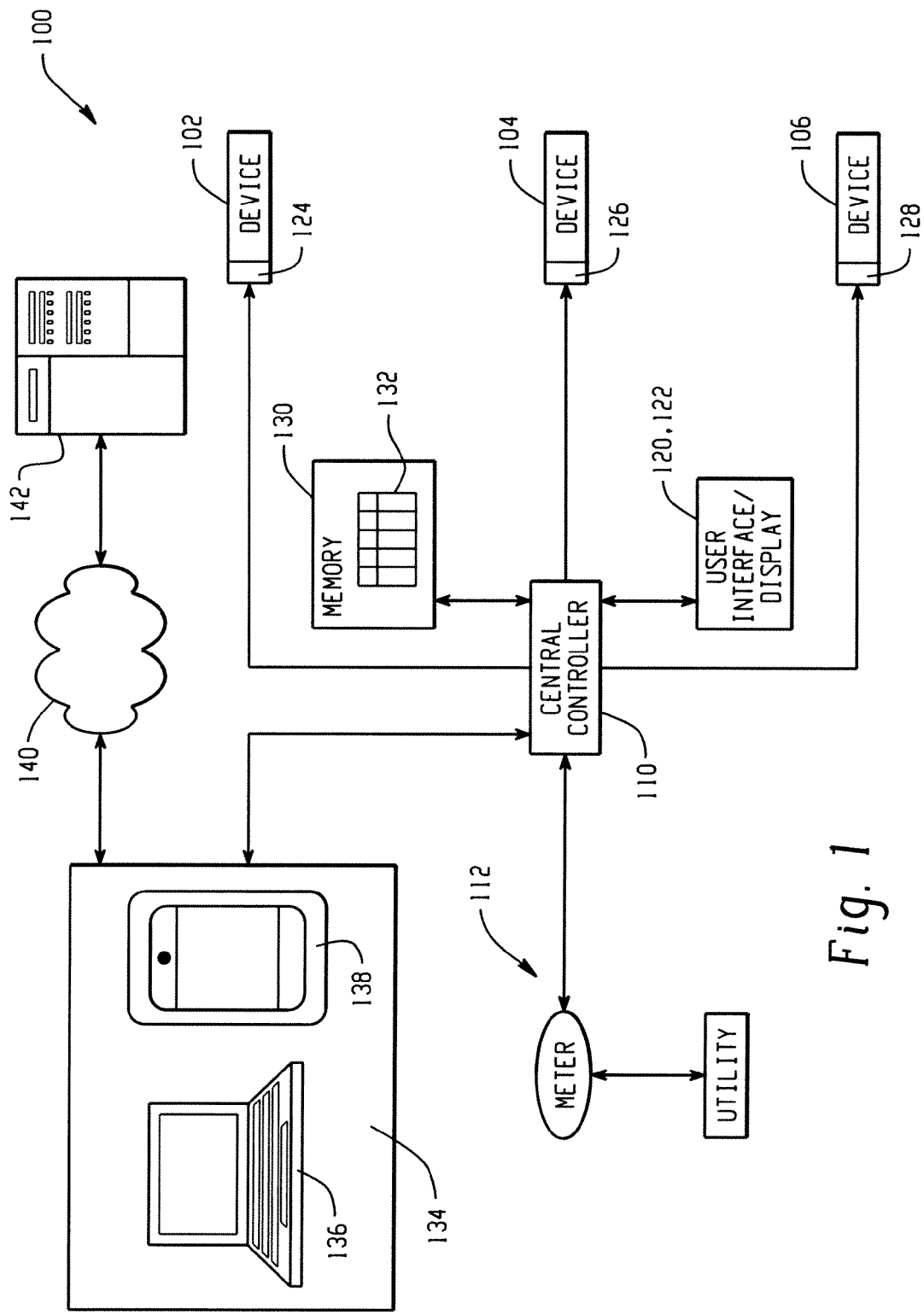
FIG. 1 is a prior art schematic illustration of an energy management system with one or more devices.

FIG. 1 schematically illustrates an exemplary home management system 100 for one or more energy consuming devices, such as devices 102, 104, 106 as is presently known. Each of the devices 102, 104, 106 can comprise one or more power consuming features/functions. For example, device 104 can be a refrigerator, an HVAC system, and/or any energy consuming device capable of having power consumption measured thereat. The controller 110 is operatively connected to each of the power consuming features/functions. When operating as a HEM, the central controller 110 may transmit signals received from the utility (via smart meter or other means) along to devices, such as appliances 102, 104, and 106 connected to a home area network (HAN). The central controller 110 controls which devices shed load by going into an energy savings mode or other power deferred state.

The controller 110 may include a user interface 120 having a display 122. The display may include an LCD touch screen for enabling use interaction and input regarding what information is displayed, or the user interface 120 can include separate control buttons for making various operational selections. The user interface and display may comprise a cellular phone, PDA, personal computer, tablet computer, smart phone, pager, television, and the like. The controller 110 is configured to gather information and data related to current usage patterns and as well as current power costs, and generate historical usage charts therefrom. This information can be used to determine current energy usage and cost associated with using each device/appliance in at least one of the energy savings mode and normal mode. This real-time information (i.e., current usage patterns, current power cost and current energy usage/cost) can be presented to the user via the display.

The devices 102, 104, and 106 may additionally transmit energy/power consumption information to the central controller 110. The controller 110 may comprise a memory 130 having at least table 132 of FIG. 1 that collects energy consumption, generation and/or storage data for a home or other network (e.g., warehouse, business, etc.). The table comprises variables associated with the heating and cooling conditions of the home, for example. A table may be generated for each device and any given operating mode that includes historical home data that is currently updated and future projected data, which may be used in a client application of a client device, such as a computer or mobile phone, for presenting graphs or other data to the user.

The controller 110 communicates to the sensor radios via one or more wireless radios. The interface radios may include ZigBee (802.15.4), WiFi (802.11), and an FM receiver. The device controller 110 can also include USB ports for adding additional functionality.

In one embodiment, the controller 110 connects via either Ethernet or WiFi to the homeowner's router and to a client application 134 in a personal computer 136 and/or a mobile device 138 to access the Internet 140 of FIG. 1. This allows for remote service and monitoring capability. A server 142 can keep records of all homes therein that may be accessed remotely via the interne.

Figure 2:
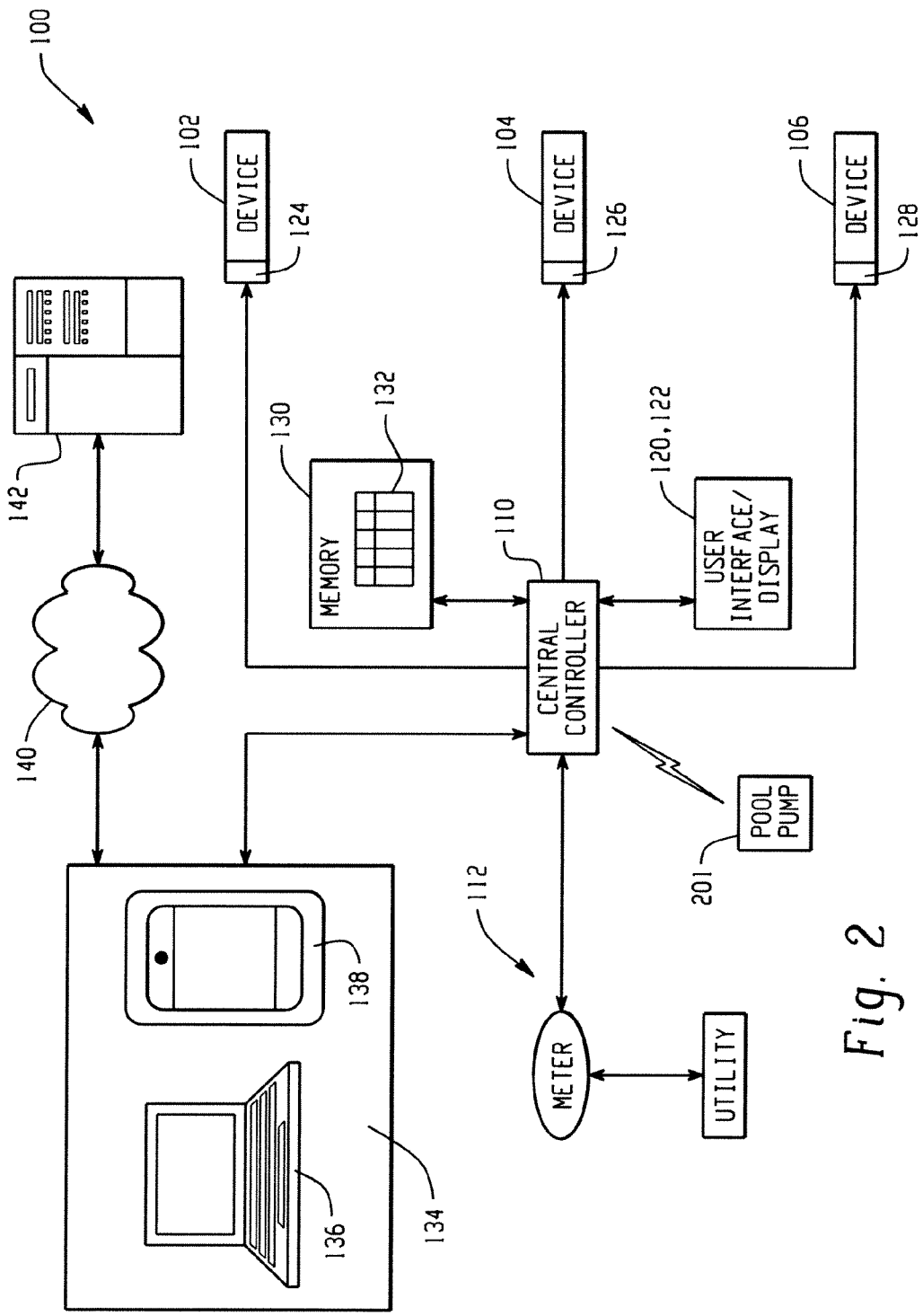
FIG. 2 is a schematic illustration of an energy management system including a pool pump in accordance with one aspect of the present disclosure.

In accordance with the present disclosure, the home energy management system includes a pool pump 201, as illustrated in FIG. 2. Typically, pool pumps include an electric motor that spins an impeller inside the pump housing, driving the water from the various drains through a filtration cycle and back out to the pool. The motor is typically controlled by a microcontroller capable of turning the power supply on and off at designated times of the day to filter contaminates from the pool water. This microcontroller is enabled with a communications port whereby it is capable of sending and receiving messages to and from the central controller 110 acting as a HEM/HEG via a wired or wireless connection.

Typical pool pumps run anywhere from about 4 hours a day in the winter, up to about 24 hours in the summer, and may consume about 500-2,000 watts of power daily. Pool pumps are generally run on automatic cleaning and filtration cycles within the variable energy consumption rate system. Running a pool pump during a high or peak demand period will increase the cost of usage, as opposed to operating the pool pump in the same manner during a low or non-peak demand period. By moving the cleaning and/or filtration cycles to a lower demand period, cost of energy usage may be reduced. Alternatively, the cycles can be operated in a "reduced load" situation, such that some water movement will occur with a reduced filtering effect. Additionally, by scheduling the pool pump system to run when other high load usage systems are off, instantaneous usage can be reduced, which necessarily reduces the total cost.

Pool pump 201 includes a microcontroller with a communications port that is capable of communicating with the central controller 110. The central controller 110 and the communications port of the microcontroller form a communications path that enables the central controller to drive the pool pump and reduce peak energy consumption on command. There are several ways to accomplish this communication, including but not limited to power line carrier (PLC) (also known as power line communication), FM, AM SSB, WiFi, ZigBee, Radio Broadcast Data System, 802.11, 802.15.4, etc. For instance, the generator can have the following wireless capability: 802.11 WiFi, FM receiver, and 802.15.4 compliant Zigbee radios.

The central controller 110 is configured to receive a signal from an associated DSM module, associated utility, or other energy provider, that includes information regarding current energy usage, such as for example, the status of the demand period (i.e., peak demand period, off-peak demand period, mid-peak demand period, etc), price information, duration of demand period, and the like. Based on this information, the central controller 110 is configured to schedule the operation of the associated pool pump's cleaning and filtration cycles, such that the cycles operate primarily during low demand and rate periods.

The central controller 110 may track and manage the usage schedules of other devices 102, 104, 106 in the HAN, such as a microwave, oven, dishwasher, HVAC, etc. Using this knowledge of the various other devices in a HAN, the central controller can schedule the pool pump cleaning and filtration cycles at times when usage of other devices in the HAN is low. For instance, the central controller 110 can monitor an HVAC cycle, and schedule the pool pump to operate on a mirror image cycle, which is opposite to that of the HVAC. According to this method, the pool pump may be scheduled to run when the HVAC is OFF, and the pool pump may shut OFF when the HVAC is ON, thus reducing simultaneous usage, particularly in times of peak energy demand. By running the pool pump during reduced usage of other HAN devices, the HAN experiences a more flat-lined, constant energy usage, rather than disproportionate intervals of high and low usage that will put a larger load on a HAN.

For homeowners that prefer to only run a pool pump when they are home, the homeowner may customize home and away settings that limit the operation of the pool pump to that during the periods that the homeowner is home. For example, a homeowner may program the controller to deactivate the pool pump during a specified time that the homeowner will be on vacation. The pool pump may additionally be programmed such that the pump is reactivated at such a time that the pool is ready for use when the homeowner returns.

Similarly, a "start now" setting may be provided, enabling a user to start a pool pump's cleaning/filtration cycle at any given moment. To ensure the user does not initiate a cycle just prior to, or during a peak demand period or another such undesirable moment, the central controller 110 can display usage information on a user interface display. If, after a user selects the "start now" option, there is no peak demand period in progress or scheduled to interfere with the projected cycle, the controller may schedule the pool pump cycle to begin at that time. In the event the central controller identifies an upcoming or present peak demand period, the central controller may decide to schedule the cycle for a later time, once the peak demand period has passed. Likewise, the central controller can be programmed to pause the pool pump cycle in the event a peak demand period occurs mid-cycle, and the controller can resume the cycle for the remainder of the calculated timeframe at a later time, such as at the conclusion of the peak demand period.

A user may additionally input pool pump specifications into the user interface, such as pool volume, pump flow rate, etc. and the central controller may then calculate a projected cycle length based on this information and the desired "water turns" inputted by a user. Based on this information, a user may input a desired time for the pool pump to have finished filtering the pool, and the controller can determine the best start time to keep energy consumption down, while still having the pool ready at the desired time.

Figure 3:
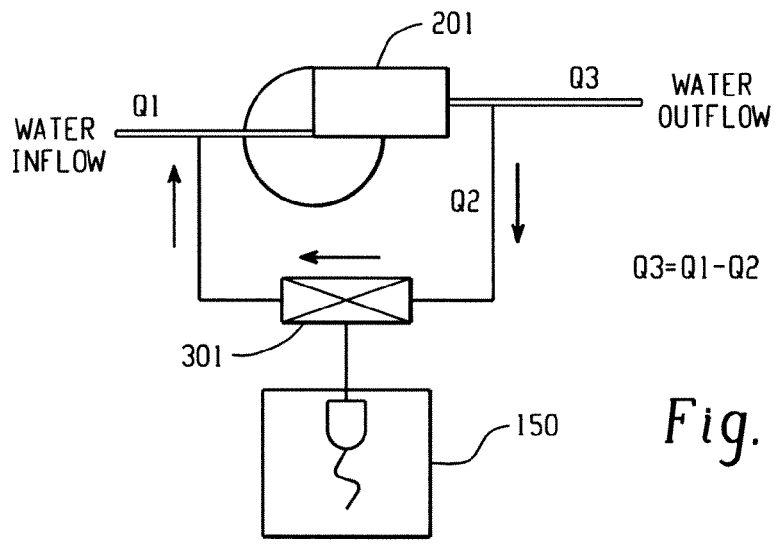
FIG. 3 illustrates an exemplary wiring diagram of the energy management system in accordance with another aspect of the present disclosure.

In addition to scheduling the pool pump to avoid periods of peak demand for reducing peak energy costs, the central controller may further reduce the pool pump energy consumption load by switching to a low-flow condition to minimize current draw. A low flow condition is evidenced by a reduction in the flow rate of water to/from the pool pump. Reducing the volume of water flowing through the system is a result of operating the pool pump at a lower speed. This will result in a reduction in current draw by the pool pump in turn resulting in reduced power consumption. According to one embodiment, best illustrated in FIG. 3, a bypass valve 301 is implemented in a parallel connection with the pool pump 201, therein bypassing the pool pump 201. This method reduces flow through the downstream system of piping and filtration media, since a portion of the water inflow circulates only through the pool pump 201 and does not re-enter the flow downstream, thereby reducing the energy consumed by the pool pump system. The valve 301 can be controlled by a secondary controller 150, or similar controller device, including the central controller. Essentially, the pump can be controlled such that a specific wattage is consumed. By having a secondary controller, the bypass valve can be independently controlled when required. As mentioned earlier, when the volume of water discharging from the pool pump and flowing through the downstream system is reduced, the system pressure drop is reduced, causing the pump to consume less power. Water is pumped through the system, from the pool pump to the filtration unit and returned back to the pool pump from the pool by the pressure differential generated by the pool pump having an integral motor. With the bypass valve in FIG. 3 in the closed position, all of the water coming in from the pool to the pump is circulated through the filtration unit. With valve in a partially closed or fully open position, water that enters the pool pump Q1 will be diverted in a circular loop Q2 and only a portion of the total flow will pass through the filtration unit Q3. As illustrated in FIG. 3, Q3=Q1−Q2.

Figure 4:
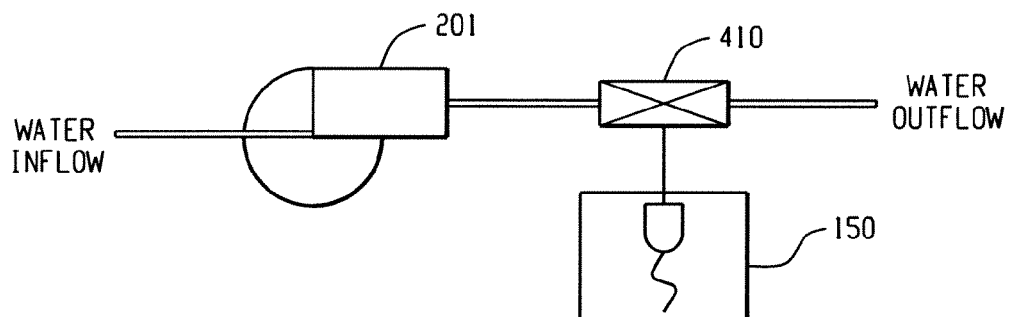
FIG. 4 is an exemplary wiring diagram illustrating another aspect of the of the energy management system in accordance with another aspect of the present disclosure.

As illustrated in FIG. 4, a control valve 410 may be provided in the pool pump system at the pump discharge to throttle flow. Depending on the signal received from the central controller 110, or a similar secondary control mechanism, the control valve 410 will rotate opened or closed to a particular degree. The control valve 410 can be a butterfly-type valve, or other valve known and used in the art. Butterfly valves are used to isolate or regulate flow, having a disk that may be turned to block the flow passageway in various degrees. As the flow is diminished due to increased flow restriction, power consumption is also reduced. It is to be noted that care should be exercised as to not completely block the flow, causing the pump to "dead head" and overheat.

Another means of reducing flow includes adjusting the speed of the motor driving the pump as a way of reducing energy consumption. The method of reducing the motor speed should be engineered in a particular manner to ensure the energy consumption and pump curves remain compatible for efficient flow.

Figure 5:
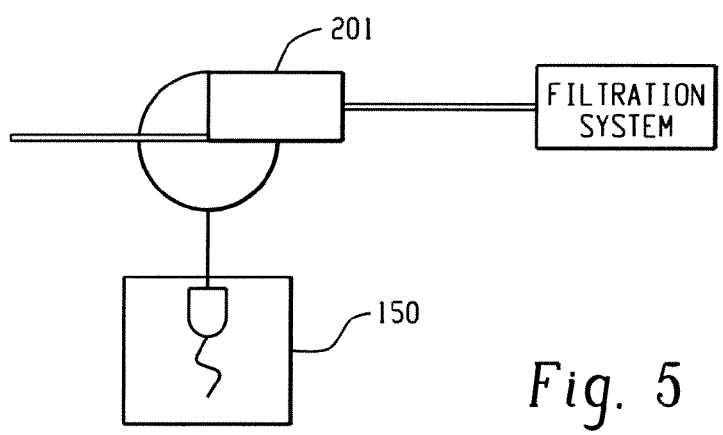
FIG. 5 illustrates an exemplary wiring diagram of the energy management system in accordance with another aspect of the present disclosure.

Additionally or in the alternative, as best illustrated in FIG. 5, a multi-stage pump 201 may be provided that includes multiple flow conditions triggered by the central controller 110 in response to a peak demand signal from the DSM. As one example for illustration purposes but not limited in scope, in response to a peak demand signal, the controller 110 can switch the pump 201 from a high flow condition to a low flow, thus proportionally reducing the energy consumed during the peak demand period without completely pausing or postponing a pool pump filtration cycle.

Figure 6:
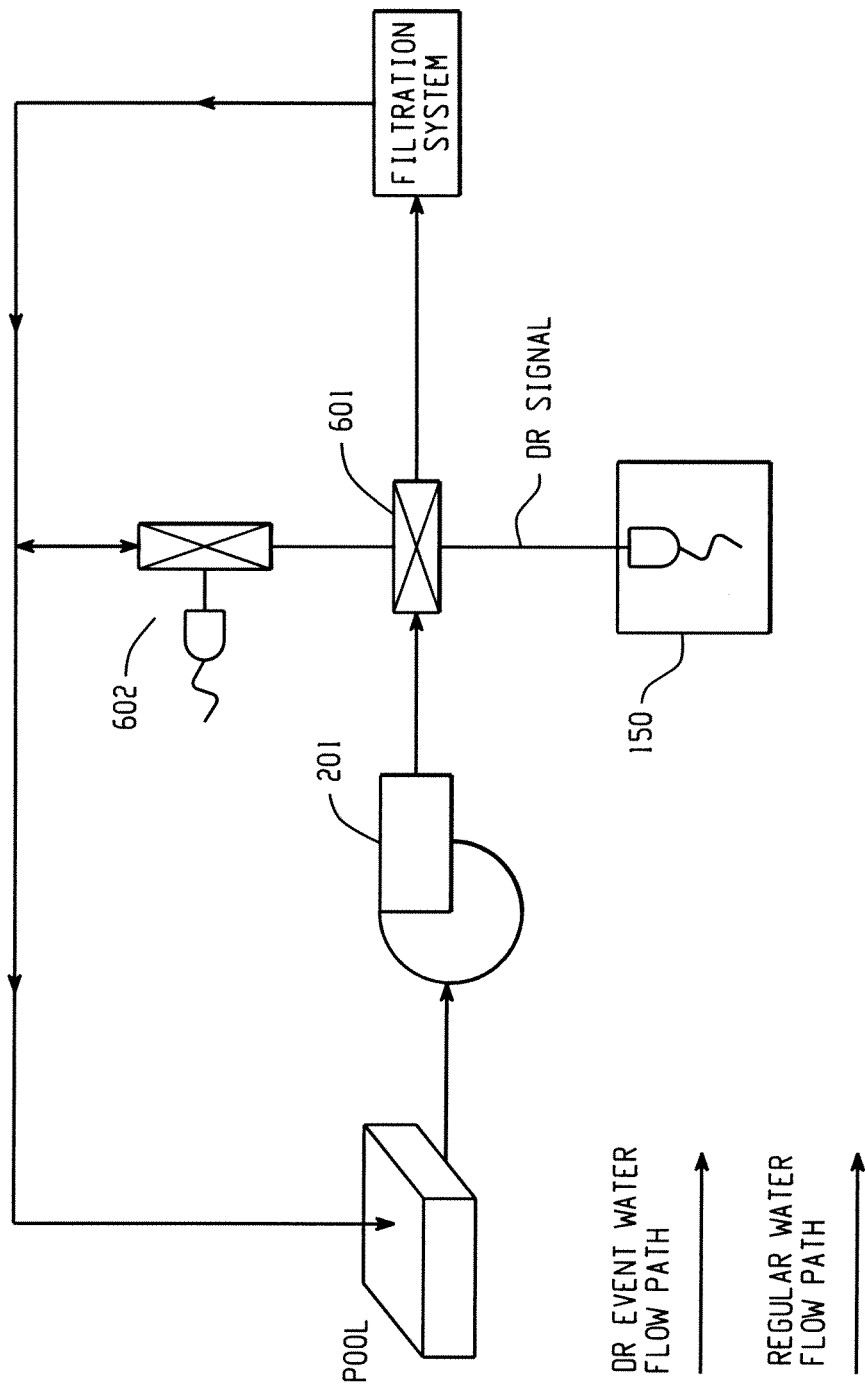
FIG. 6 illustrates an exemplary wiring diagram of the energy management system in accordance with another aspect of the present disclosure.

The filter may alternatively be bypassed completely to reduce energy consumption during a peak demand period, as illustrated in FIG. 6. In response to a signal from the central controller 110 indicative of a peak demand period, the bypass valve 601 will close and control valve 602 will open concurrently which will cause the water to bypass the filtration system and return the water directly to the pool from pump 201. Likewise, these valves can be modulated in unison to provide various percentages of filtration by lessening the total flow through the filtration medium if desired. In turn, the current draw of the pool pump motor is reduced, while still allowing the maintenance of water circulation (albeit without filtering capability) during a peak demand response event. The pressure drop through the filtration media may be significant, which greatly reduces the head requirements and subsequently the power consumption of the pool pump motor.

According to another aspect, the central controller may additionally or alternatively include a scheduling algorithm that enables a user to program and adjust a schedule for a pool pump in the user's home energy management system. This scheduling algorithm is configured to provide the user with one or more graphical user interfaces (GUI) on a display device that the user may use to program and adjust the pool pump schedule. The user may schedule, for example, pool pump on/off times, runtime length, power level, and/or pump speeds, in the case of pool pumps with variable pump speeds. The algorithm may provide multiple variations of the graphical user interfaces depending on the nature of display devices employed. For example, the algorithm may provide a different GUI for a user's mobile phone, computer screen, touchscreen display, television widget, and the like. Accordingly, a user may implement a number of devices to remotely program a pool pump, allowing a user increased opportunities to save on energy consumption and cost. This provides a user the freedom to interact with the pool pump schedule without having to be standing physically in close proximity of the unit, or even be at home.

Upon receiving a signal of an upcoming or present peak demand period from the DSM, the central controller may present this information to a homeowner via the user interface on the display to alert a user as to the high demand period and possible cost implications of running the pool pump during this peak demand period. Based on this information, the user can determine what functions of the pool pump they want to limit, postpone, or cancel during the period of increased rate. Since pool pumps tend to run for around 8-10 hours a day, a user may implement the proposed algorithm via the GUI of a display device to set the limitations that the pump may not run between the hours of, for example, 3 pm-6 pm or 10 am-12 pm. The user may also set preferences for times of the day/night to operate the pump, such as at night, when energy rates are low. Once a user programs a particular schedule for an associated pool pump, the central controller for operates the pool pump according to the set schedule. The central controller transmits the programmed on/off times and/or pump speeds to the microcontroller of the pool pump in order to control the pump's operation.

Minimizing the cost difference between energy management and non-energy management devices makes it easier for utilities to provide rebates and other incentives for consumers to switch to energy management devices. If features provided on energy management devices make sense and are well communicated to consumers, consumers will be more likely to use them, thus reducing energy demand during a peak consumption period and saving energy. Additionally, providing consumers with energy management information visually will make it less likely for a user to call for service because they think the device is broken when it will not do what they want.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An energy management system for a home network comprising:
    one or more power consuming devices, including at least a pool pump system comprising a motor, a filter with a filtration cycle, and a bypass valve configured to redirect a portion of water inflow around the pool pump system without entering the filter;
    a central controller operatively connected to the power consuming devices and configured to receive and process a signal indicative of the current state of an associated utility, including at least a peak demand state and an off-peak demand state; and
    a display;
    wherein said central controller is configured to operate the pool pump system in one of a plurality of operating modes, including at least a normal operating mode and an energy savings mode, and to provide pool pump usage information to a user via a user interface on said display; and said central controller is operatively connected to the bypass valve to divert a portion of the water inflow around the pool pump system in the energy savings mode to reduce the energy consumed by the pool pump system.

2. The energy management system according to claim 1, wherein said controller is configured to operate said pool pump system primarily in off-peak energy demand periods.

3. The energy management system according to claim 1, wherein said power consuming devices further includes at least one HVAC.

4. The energy management system according to claim 3, wherein said central controller is configured to operate said pool pump system according to a schedule opposite that of said HVAC.

5. The energy management system according to claim 1, wherein said user interface is configured to receive operating instructions for the pool pump system from said user.

6. The energy management system according to claim 5, wherein said operating instructions include at least one of a home setting, an away setting, a "start now" setting, and a low-flow setting.

7. The energy management system according to claim 1, wherein the pool pump system further includes a control valve capable of opening and closing in various degrees to increase and decrease flow restriction.

8. The energy management system according to claim 1, wherein the pool pump system further includes a dual-stage pump having each of a high- and low-flow condition, wherein said central controller is configured to switch from a high-flow to a low-flow condition in response to a signal indicative of a peak demand period.

9. A method for reducing the peak power consumption of a pool pump system in an energy management system including one or more power consuming device, a central controller configured to receive and process a signal indicative of the current state of an associated utility, the utility state being at least one of a peak demand period and an off-peak demand period, and a pool pump system having a motor and filter with a filtration cycle, said method comprising the steps of:
    a) receiving and processing a utility state signal into said central controller;
    b) at least one of operating and scheduling to operate said pool pump system such that the pool pump system operates primarily during an off-peak demand period; and c) operating said pool pump system in a reduced-flow condition during periods of peak demand, including implementing a bypass valve and re-circulating water around the pool pump system and back into an associated pool without entering the filtration cycle.

10. The method according to claim 9, further including tracking the usage of each power consuming device in said system and scheduling the pool pump system operation at times usage of the power consuming devices is low.

11. The method according to claim 9, wherein the at least one power consuming device includes an HVAC, wherein the pool pump system is scheduled to operate when the HVAC is inactive.

12. The method according to claim 9, wherein said pool pump system includes a "start now" setting, enabling a user to activate the filtration cycle at any moment.

13. The method according to claim 10, wherein bypassing the filtration cycle maintains water circulation without filtration.

14. The method according to claim 9, wherein operating in a reduced-flow condition includes implementing a control valve and rotating the valve to block a water flow passageway in various degrees.

15. The method according to claim 9, further including adjusting the speed of said motor driving said pool pump system.

16. The method according to claim 9, wherein operating in a reduced-flow condition includes implementing a dual-stage pump and switching a pool pump flow condition from that of a high flow to a low flow.

17. The energy management system of claim 1 wherein the central controller is further configured to receive a signal of an upcoming peak demand period and present, on the display, possible cost implications of running the pool pump during the upcoming peak demand period.

* * * * *

UNITED STATES PATENT AND TRADEMARK OFFICE
CERTIFICATE OF CORRECTION

PATENT NO. : 8,489,242 B2  
APPLICATION NO. : 12/985479  
DATED : July 16, 2013  
INVENTOR(S) : Valluri et al.

Page 1 of 1

It is certified that error appears in the above-identified patent and that said Letters Patent is hereby corrected as shown below:

In he Specification

In Column 4, Line 26, delete "interne." and insert -- internet. --, therefor.

Signed and Sealed this  
Twenty-second Day of October, 2013

Teresa Stanek Rea  
*Deputy Director of the United States Patent and Trademark Office*